United States Patent [19]  [11] Patent Number: 4,897,525
Hirsch  [45] Date of Patent: Jan. 30, 1990

[54] DEVICE FOR HEATING FOOD WITH STEAM

[76] Inventor: Paul Hirsch, Karl-Theodor-Strasse 91, 8000 München 40, Fed. Rep. of Germany

[21] Appl. No.: 166,567

[22] Filed: Mar. 11, 1988

[30] Foreign Application Priority Data

Mar. 13, 1987 [DE] Fed. Rep. of Germany ... 8703814[U]
Nov. 2, 1987 [DE] Fed. Rep. of Germany ....... 3737156

[51] Int. Cl.$^4$ .............................................. F22B 1/28
[52] U.S. Cl. .................................. 219/401; 219/273; 219/440
[58] Field of Search .............. 219/400, 401, 271, 272, 219/273, 275, 276, 385, 386, 440; 126/369, 20.2, 369.1, 369.2, 369.3, 20, 20.1

[56] References Cited

U.S. PATENT DOCUMENTS

| 1,344,326 | 6/1920 | Williams | 219/401 |
| 1,430,548 | 10/1922 | Hogue | 219/273 |
| 1,741,569 | 12/1929 | Hindman . | |
| 2,211,407 | 8/1940 | Christensen | 219/272 |
| 2,533,794 | 12/1950 | Hanks | 219/275 |
| 2,766,366 | 10/1956 | Eckhoff . | |
| 2,867,712 | 1/1959 | Schwaneke . | |
| 3,219,795 | 11/1965 | Wiseman | 219/271 |
| 3,331,943 | 7/1967 | Eff | 219/401 |
| 3,502,309 | 3/1970 | Flores | 219/272 |
| 3,695,066 | 10/1972 | Doyel | 219/271 |
| 3,714,391 | 1/1973 | Katzman | 219/271 |
| 3,809,374 | 5/1974 | Schossow | 219/273 |
| 3,902,044 | 8/1975 | Doyle | 219/284 |
| 4,013,869 | 3/1977 | Orts | 219/401 |
| 4,509,412 | 4/1985 | Wittenburg | 99/331 |
| 4,650,968 | 5/1987 | Williams | 219/401 |

FOREIGN PATENT DOCUMENTS

| 41645 | 4/1887 | Fed. Rep. of Germany . |
| 382440 | 10/1923 | Fed. Rep. of Germany . |
| 2516770 | 10/1976 | Fed. Rep. of Germany . |
| 3011063 | 10/1980 | Fed. Rep. of Germany . |
| 3221347 | 1/1984 | Fed. Rep. of Germany . |
| 2398433 | 2/1979 | France . |
| 820555 | 9/1959 | United Kingdom . |
| 1179164 | 1/1970 | United Kingdom . |

Primary Examiner—Teresa J. Walberg
Attorney, Agent, or Firm—Henry M. Feiereisen

[57] ABSTRACT

A device for heating food with steam includes a relatively small water container heated by an electric heating source so that steam is generated very shortly after switching on the heating source. The evaporated water is at least partly steadily resupplied preferably from the condensate of the steam precipitating at the inside of the lid of the device, or via a separate water reservoir which is defined by the bottom space of the base of the device.

15 Claims, 1 Drawing Sheet

DEVICE FOR HEATING FOOD WITH STEAM

BACKGROUND OF THE INVENTION

The invention refers to a device for heating food with steam.

A device of this kind includes a base provided with a water container for receiving water, a depositing surface for receiving the food to be heated, and a lid for covering the base and the depositing surface.

The particular advantage of such a pressure cooker is the careful heating of food which neither burns nor leaches out or otherwise is damaged. A conventional pressure cooker thus allows food to be kept warm for an extended period without suffering any quality loss.

A pressure cooker of this type has, however, the drawback that the heating of food takes a relatively long time since the entire base serves as water container and thus the voluminous water content of the base must be boiled at first. For the same reason, the known pressure cooker is also hardly usable for heating food because the electric heating source must be periodically switched on and off in this case. The long response time of the pressure cooker leads, however, to extensive temperature fluctuations in the food to be kept warm.

The invention is based on the object to develop a device of this type in such a manner that the food can be heated and kept warm in a faster manner without being subjected to high temperature fluctuations.

SUMMARY OF THE INVENTION

The base is provided with a separated water container, the capacity of which is relatively small so that only a relative small amount of water is contained which can be evaporated very rapidly by a relatively low heating power.

In accordance with the invention, the evaporated water is continuously replaced so as to allow generation of steam for an extended period despite the small volume of the water container.

In the device according to the invention, the full steam generation is obtained already shortly after switching on so that steam required for heating the food is available very rapidly.

The short period of response of the device according to the invention also allows its use for keeping warm food whereby the repeated switching on or off of the heating unit maintains the already heated food rather accurately at the desired temperature because at decreasing temperature of the food, the heating unit is switched on so that the food is then heated very soon. When the food reaches the desired temperature and the heating unit is switched off, the base does not contain a large amount of boiling water as the known pressure cooker in which the generation of steam only gradually tapers off and thus heats in undesired manner, but the small amount of water contained in the water container stores only a relatively small heat; Thus, very shortly after switching off the heating unit, the generation of steam is discontinued thereby allowing food which should not reach the boiling point to be maintained at a temperature below the boiling point without the danger that the temperature of the food reaches the boiling point at one point.

According to a preferred embodiment of the invention, the water container is provided as groove in the base. The lid is provided in such a manner that the condensate of the steam precipitating thereon is returned into the groove.

According to a further, also preferred embodiment of the invention, the water container is confined by a partition which is placed on the bottom of the base. In this case, the base defines a water space in the center of which the partition is arranged, with the height of the partition being dimensioned in such a manner that it extends beyond the water level in the base.

An aperture-like opening connects the water space formed by the base with the water container defined by the partition within the base whereby the size of this passage is dimensioned in such a manner that at least the amount of water which continuously evaporates at running heating unit can be resupplied.

Preferably, the heating unit is an immersion heater which gives off its entire heat practically without any loss to the water and thus further contributes to speeding up the heating time.

The partition can be an insert which is loosely placed in the base; it may, however, also be attached to the upper side of the bottom or to the underside of the food depositing surface which in turn is preferably a perforated plate.

According to a further embodiment of the invention, a thermostat is provided which is arranged in the water space and controls the switching on and off of the heating unit whereby the reheating period is used during which after switching off the heating unit the heat stored by the latter is given off to the water in the water container. Thus, despite by having the thermostat set a temperature which is below the boiling point, it is possible to achieve a more or less extended boiling of the small amount of water in the water container and thus the generation of a greater or smaller amount of steam.

According to a preferred embodiment of the invention, the aperture-like water passage can be made especially advantageous by not enclosing the water container all-around but by providing or defining the partition with at least one gap of a width which is dimensioned such that the discharge of a larger amount of heated water from the water container into the water space is just about prevented. The advantage of this arrangement resides in the fact that despite vigorously boiling water a relatively large amount of water can be flow into the water container so that it is possible to dimension the heating unit relatively large thereby further shortening the time required for heating the food.

Preferably, the water passage is provided by confining one side of the water container by a side wall of the base while the remaining sides are enclosed by the partition which in turn extends with both its ends at a distance to the mentioned side wall so that water flows into a relatively cold area of the water container and thus this flowing action cannot be obstructed by rising steam bubbles or the like.

BRIEF DESCRIPTION OF THE DRAWINGS

The subject matter of the invention will now be described in more detail with reference to the accompanying schematic drawing in which.

DESCRIPTION OF THE PREFERRED EMBODIMENTS

Figure 1:
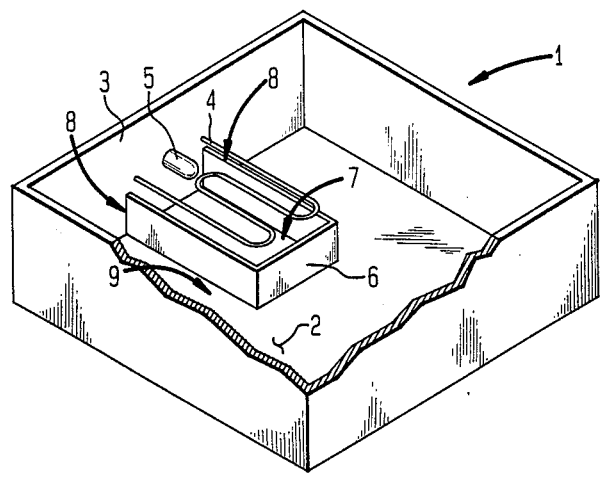
FIG. 1 shows a partly broken perspective view of the base of a preferred embodiment of the device according to the invention.
Figure 2:
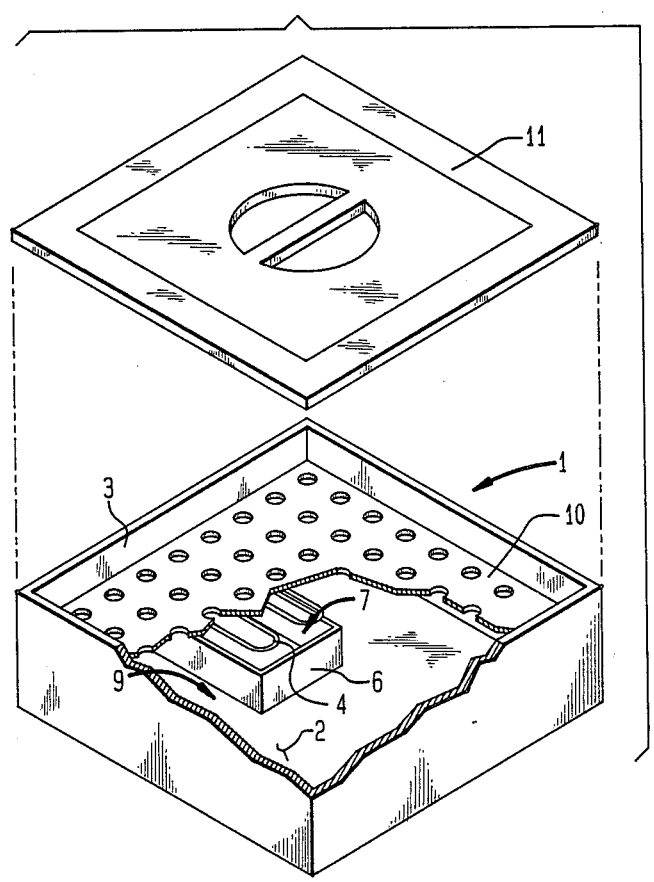
FIG. 2 shows a perspective view of the device of FIG. 1 provided with a suitable grate and a lid.

The illustrated base 1 includes a flat bottom 2 of essentially square or rectangular cross section, three side walls and one rear wall 3. The upper edge of the base 1 may be provided with an outer flange so as to be attachable in a frame or counter. At the underside, heat-insulating feet may be arranged.

The base 1 is preferably made of food-compatible, rust-free high-quality steel.

The rear wall 3 of the container 1 is penetrated by an immersion heating coil 4 which extends at small distance from the bottom 2 and parallel thereto.

It is, however, also conceivable and even of advantage in some circumstances that the immersion heating coil 4 does not extend through the rear wall 3 but rather is angled in proximity thereto and detachably mounted so that the cleaning of the base and the immersion heating coil is improved by allowing the latter to be removed from the base.

Arranged at the bottom 2 is a partition 6 which is defined by a strip of food-compatible, rust-free steel bent twice at a right angle, being of essentially constant height over the bottom 2 and welded to the latter. The partition 6 extends also beyond the heating coil 4.

Both free ends of the partition 6 do not extend to the rear wall 3 but end shy of the latter under formation of a small gap 8.

The bottom area in the base 1 and outside the area surrounded by the partition define a water space 9 while the partition 6 encloses a water container 7. The gap 8 connects the water space 9 with the water container 7 so that at both sides of the partition 6 the same water level prevails which is below the upper edge of the partition 6 and preferably above the immersion heating coil 4.

When operating the device, a suitable grate or perforated bottom 10 is inserted in the base 1 and may be supported on its own feet, or by projections of the walls of the base or directly by the partition 6. The upper side of the base is closed by a suitable lid 11.

Further arranged in the water container 7 is a heat detector 5 which projects through the rear wall and is connected to a thermostatic switch. Although not shown in the drawing, a switch box is provided at the outer side of the rear wall 3 and includes a temperature selector for the temperature to be controlled by the thermostat, a cutout and a control lamp. Further, a safety switch against overheating is provided which, however, is not shown in the drawing.

When operating the device, the bottom 2 is filled with water to the above-stated water level, and the grate or the perforated bottom 10 which is not shown in the drawing is then inserted. Food to be heated or e.g. to be kept warm is directly placed on the grate or bottom 10 or placed thereon with a plate. Subsequently, the lid 11 is closed.

For heating the food, the above-stated cutout is switched on so that the immersion heating coil 4 steadily gives off heat. The water in the water container 7 is boiled very rapidly and continuous to boil, with cold water flowing from the water space 9 through the gap 8 into the water container 7.

After a relatively short time, usually only a few minutes, the food is heated and the device may be switched to maintain the food in a heated state. Thus, the cutout is switched off and the thermostat selector lever is set to a desired temperature. This temperature, however, does not correspond to the temperature as measured by the heat detector 5 but corresponds to the temperature of the food to be kept warm and is in relationship with the desired water temperature in the water container 7.

The immersion heating coil 4 is now periodically switched on and off so that a certain amount of steam is periodically generated to ensure that the slightly cooled off food is heated again to the desired temperature.

When maintaining the temperature over a long period, the water in the water space 9 will also be heated up, however, this does not have any negative impact on the operation of the device, rather it contributes to keep the food uniformly warm.

I claim:

1. A device for heating food with steam, comprising:
   a base having a bottom area and defining a water space which contains water;
   a water container arranged in said base over only part of said bottom area of said base and being suitably dimensioned for receiving a small amount of water;
   a depositing surface provided for food to be placed thereon and arranged in said base outside said water container;
   heating means arranged in said water container for raising the temperature of said small amount of water to the boiling point; and
   a partition arranged in said base for defining said water container in said water space, said partition being arranged at a small distance from a side wall of said base to define an aperture-like water passage connecting said water container with said water space.

2. A device as defined in claim 1, and further comprising a lid covering said base and allowing precipitated condensate to be resupplied to said water container.

3. A device as defined in claim 1 wherein said partition is mounted to said bottom area of said base.

4. A device as defined in claim 1 wherein said partition is a separate part inserted in said water space to define said water container.

5. A device as defined in claim 1, and further comprising control means operatively connected with said heating means for maintaining the food at a desired temperature, said control means including a thermostat having a sensor arranged in said water container.

6. A device for heating food with steam, comprising:
   a base having a bottom area and defining a water space which contains water;
   a water container arranged in said base over only part of said bottom area of said base and being suitably dimensioned for receiving a small amount of water;
   a depositing surface provided for food to be placed thereon and arranged in said base outside said water container, said depositing surface including a perforated bottom defining an underside;
   heating means arranged in said water container for raising the temperature of said small amount of water to the boiling point; and
   a partition arranged in said base for defining said water container in said water space and being mounted to said underside of said depositing surface.

7. A device as defined in claim 6 wherein said water space is open to said depositing surface and essentially covers said bottom area of said base.

8. A device as defined in claim 6 wherein said heating means includes an immersion heater, said partition means surrounding said immersion heater.

9. A device as defined in claim 6 wherein said partition is a separate part inserted in said water space to define said water container.

10. A device as defined in claim 6, and further comprising control means operatively connected with said heating means for maintaining the food at a desired temperature, said control means including a thermostat having a sensor arranged in said water container.

11. A device as defined in claim 6, and further comprising a lid covering said base and allowing precipitated condensate to be resupplied to said water container.

12. A device as defined in claim 6 wherein said water container defines with said water space an aperture-like water passage via which said water container is connected with said water space.

13. A device as defined in claim 12 wherein said partition is arranged at a small distance from a side wall of said base to define said aperture-like water passage connecting said water container with said water space.

14. A device as defined in claim 1 wherein said water space is open to said depositing surface and essentially covers said bottom area of said base.

15. A device as defined in claim 1 wherein said heating means includes an immersion heater, said partition means surrounding said immersion heater.

* * * * *